Aug. 15, 1939     K. R. SHAW     2,169,886

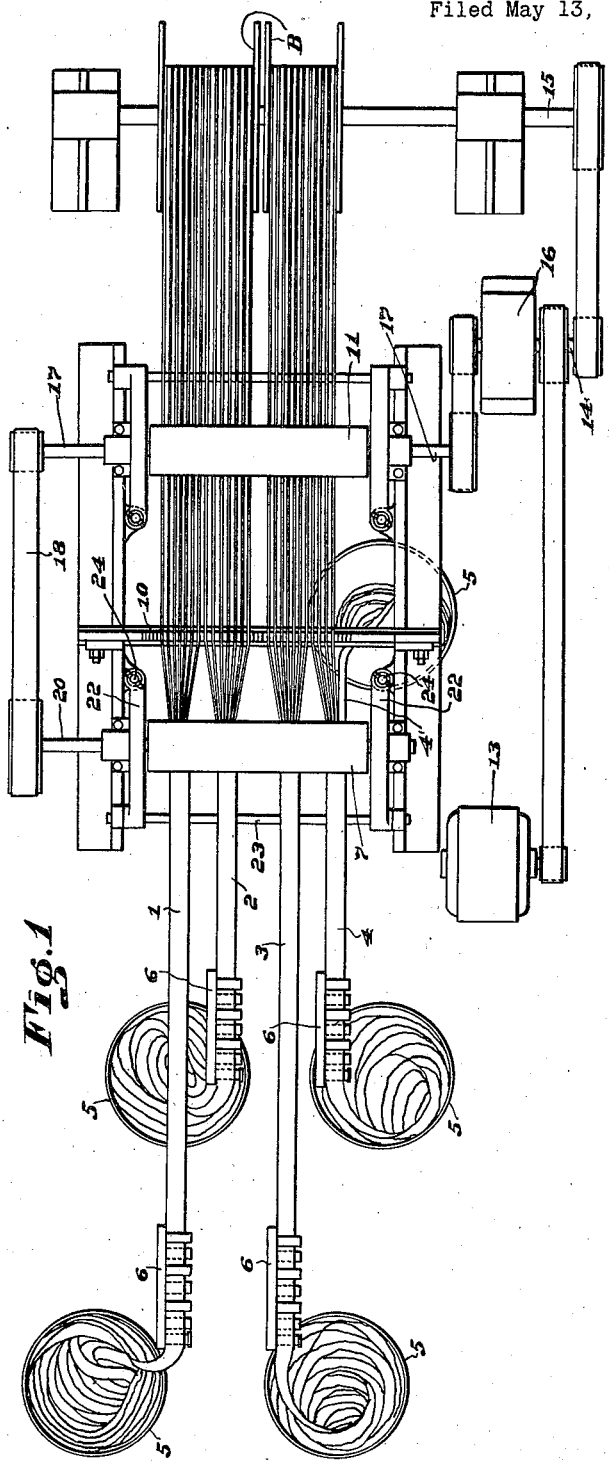

MANUFACTURE AND USE OF RUBBER THREAD

Filed May 13, 1937     4 Sheets—Sheet 2

INVENTOR
Kenneth R. Shaw,
BY
ATTORNEY.

Aug. 15, 1939    K. R. SHAW    2,169,886
MANUFACTURE AND USE OF RUBBER THREAD
Filed May 13, 1937    4 Sheets—Sheet 3
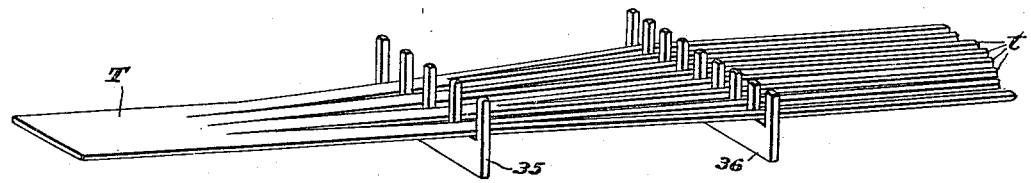
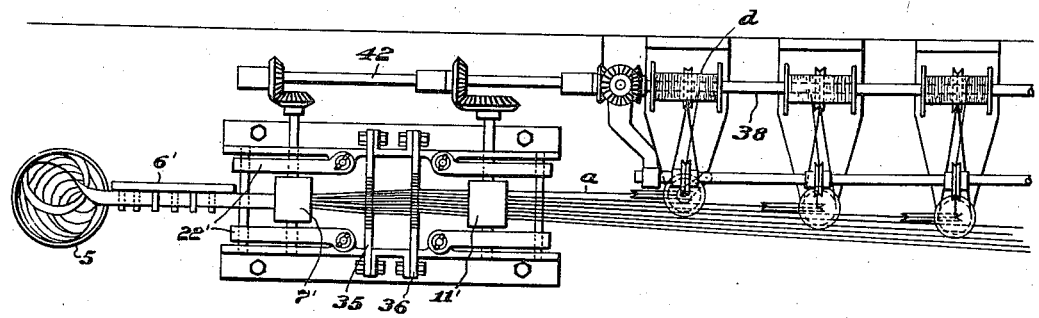
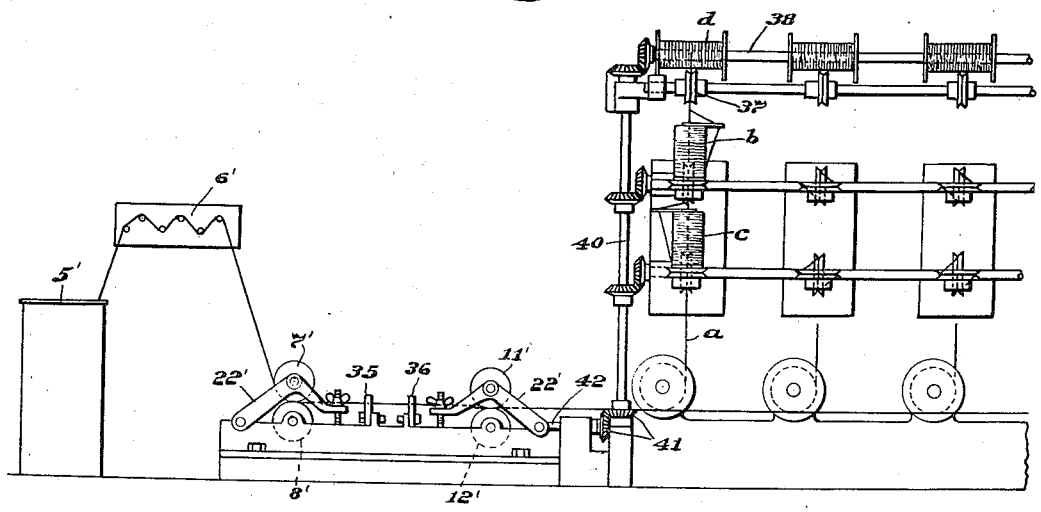

Aug. 15, 1939   K. R. SHAW   2,169,886
MANUFACTURE AND USE OF RUBBER THREAD
Filed May 13, 1937   4 Sheets-Sheet 4
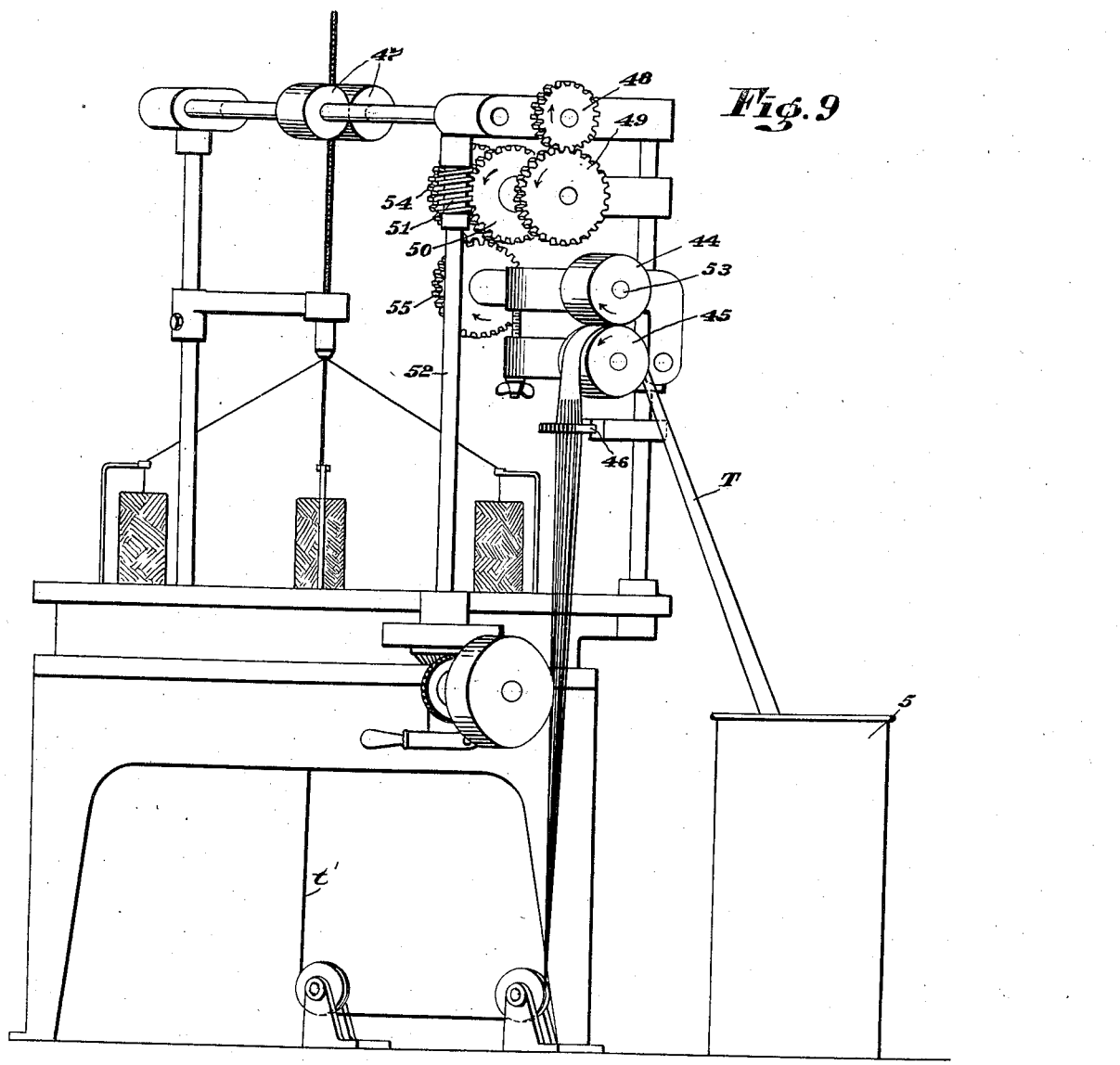
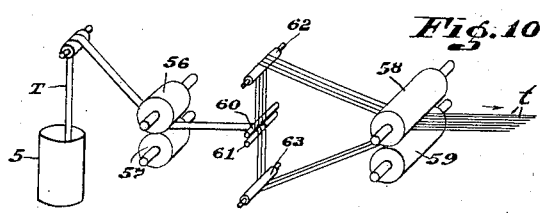
INVENTOR
Kenneth R. Shaw,
BY
ATTORNEY.

Patented Aug. 15, 1939

2,169,886

UNITED STATES PATENT OFFICE 2,169,886

MANUFACTURE AND USE OF RUBBER THREAD

Kenneth R. Shaw, Easthampton, Mass., assignor to Easthampton Rubber Thread Co., Easthampton, Mass., a corporation of Massachusetts Application May 13, 1937, Serial No. 142,417

10 Claims. (Cl. 28—1)

In my copending applications Serial Nos. 6,865 and 31,219 I have disclosed a machine for and a method of making rubber tape composed of a series of rubber threads adhesively united to each other in parallel side by side relationship. An important practical advantage of this product is that all of the threads required in a given fabricating or other machine operation such as weaving, braiding, beaming, spooling, and the like, can be supplied to the machine in this tape form, and in connection with the operation of the machine, the tape may be split or divided into its component threads which are fed to the fabricating instrumentalities. The present invention aims to devise a mechanism for performing this splitting operation expeditiously and with a high degree of reliability and so associating this mechanism with the fabricating instrumentalities that they will operate in the proper relationship to each other.

The nature of the invention will be readily understood from the following description when read in connection with the accompanying drawings, and the novel features will be particularly pointed out in the appended claims.

In the drawings,

Figure 1 is a plan view of a beaming machine embodying the present invention;

Fig. 2 is a side elevation of the machine shown in Fig. 1;

Figs. 6 and 7 are side and plan views, respectively, of a rubber thread covering machine in which the invention is incorporated;

Fig. 8 is a perspective view of the reeds or combs used in the machine shown in Figs. 6 and 7;

Fig. 9 is an angular view of a braiding machine in which features embodying the invention are incorporated; and Fig. 10 is a diagrammatic view of another form of tape splitting device constructed in accordance with this invention.

Figure 4:
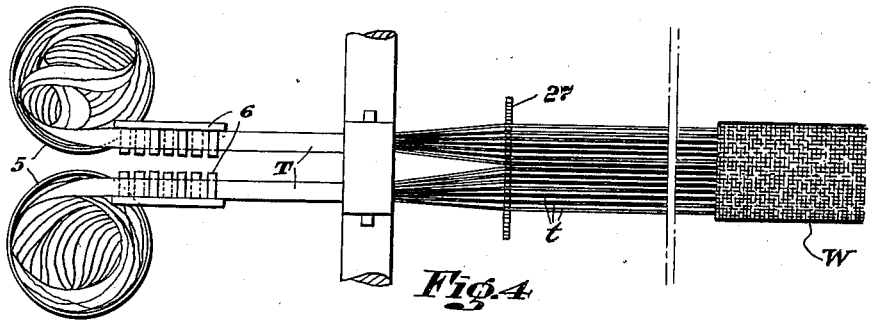
Figs. 4 and 5 are plan views showing different arrangements for feeding rubber threads to the loom shown in Fig. 3.

Referring first to Figs. 1 and 2, the machine there shown is designed to wind rubber threads on a large roll or beam, or on a plurality of such beams, the beams being designed for use in weaving, braiding, knitting, or other fabricating machines, and the thread being supplied to the beaming machine in the form of a tape or tapes of the general nature above described. In the particular construction shown it is assumed that four such tapes 1, 2, 3 and 4, respectively, are utilized, these tapes being brought to the machine in cans or containers, such as those illustrated at 5. Each tape is led from its respective container through some suitable form of tension device such, for example, as that shown at 6, which consists of a series of staggered pins around which the tape travels. From these devices the tapes are led in parallel relation between upper and lower feed rolls 7 and 8, respectively. In front of these feed rolls the tape splits into its constituent threads and these threads then pass through a reed or comb 10, next between upper and lower feed rolls 11 and 12, respectively, and thence to the beams B—B on which they are wound.

A typical drive for the rolls and for the beam shaft consists of an electric motor 13 belted to a counter shaft 14 to which the beam shaft 15 is belted, this shaft 14 also serving as the drive shaft of a variable speed drive 16. The driven shaft of this mechanism is belted to the shaft 17 of the lower front feed roll 12. A belt 18 connects the latter shaft with the shaft 20 of the lower rear feed roll 8.

When the machine is in operation the rear feed rolls 7 and 8 feed the tapes 1, 2, 3 and 4 toward the comb 10, while the front feed rolls 11 and 12 feed the individual threads toward the beams B. The front rolls are driven at a considerably higher peripheral speed than the rear rolls, a typical driving ratio being four or five to one. Consequently, this arrangement maintains the tapes and the threads between the two sets of feed rolls greatly stretched or elongated. While the threads in the tape are united to each other with a sufficient degree of adhesion to hold them in this relationship during normal handling, they are readily separated by being drawn through the comb 10 while under such a tension as that above described.

It is important to the desired operation of the machine that both sets of feed rolls grip the rubber material which they are acting upon with sufficient firmness to prevent any slip of the material and thus to maintain an accurate feeding relationship between the two sets of rolls and between the rear rolls 7 and 8 and the drum on the shaft 15. The latter relationship is important in order to maintain a uniform tension on the threads as they are wound on the drum. In this connection it may be pointed out that the drums, instead of being mounted directly on a winding shift, often are driven by peripheral contact with a driving drum on which they rest. So far as the relationship just described depends upon speed, the desired conditions may be maintained in the machine shown by the driving connections above described between the two feed rolls and between the latter and the beam.

In order to enable the feed rolls to grip the rubber tape or threads with the desired degree of firmness, I find that the best results can be obtained by making at least one of each pair of rolls of soft vulcanized rubber, or by providing the roll with a fairly thick covering of rubber of this type. For some purposes one metal roll running against a rubber covered roll is entirely satisfactory. In other situations, however, better results are obtained by providing both rolls with rubber or other resilient and yielding surfaces to engage the stock. In either construction the area of the contacting roll surfaces which act on the tape or the threads can be varied by adjusting the pressure with which the rolls are held in engagement with each other, this adjustment also determining the squeezing force exerted on the rubber stock. A convenient arrangement for providing such an adjustment is shown in Figs. 1 and 2 where the shaft of the upper roll 7 is mounted in bearings provided in two angular arms 22—22, both pivoted on a shaft or bar 23 and having their ends each slotted to receive a screw threaded stud or bolt 24 secured in the machine frame, a wing nut being threaded on the bolt and bearing on the upper end of the arm. The other top roll 11 of the front set is mounted in the same manner.

In beaming rubber thread, it is customary to wind on each beam the total number of rubber threads to be used in making a particular product in a loom, braider, or other machine. If the exact number of threads required in winding a given beam is less than the sum of those contained in one or more tapes, thus making it necessary to split a tape into a certain number of its component threads and then to leave the remainder of the tape undivided, such a result can readily be accomplished in the machine shown in Figs. 1 and 2. For example, as shown in Fig. 1, only four of the threads from the tape 4 pass through the comb 10 and go on to the beam. The remaining fraction of the tape indicated at 4', is simply guided into another one of the containers 5 and will be used in some other operation.

The invention thus provides a machine which is relatively simple in organization, is extremely reliable in operation, can readily be adjusted to suit the requirements of different kinds of work, in which the feeding of both the tape and the threads is positively effected so that a constant speed relationship is maintained between both sets of rolls and in which, also, the rate of feed of the threads to the instrumentalities which are to operate on it can be maintained continuously at the desired value. This ability to hold the proper running conditions between the rate of delivery of the thread and the rate of operation of the instrumentalities which are to act upon that thread are extremely important in many machines as, for example, looms and braiders. In other words, this invention provides an organization in which one tension may be maintained on the rubber between front and rear rolls of the splitter, and another tension may be maintained between the front rolls of the splitter and the beam or takeup roll of the machine which operates on the threads. Each of these tensions may be made of a value best suited to the operation performed at that particular point. For example, the tension required for the best performance of the devices which divide the ribbon into its constituent threads may be quite different from that desirable for the operation of the beaming, weaving, thread covering, or other fabricating instrumentalities. With this arrangement, however, each tension may be adjusted and predetermined to suit the requirements of the individual operations performed on the tape or the threads of which it is composed.

Figure 5:
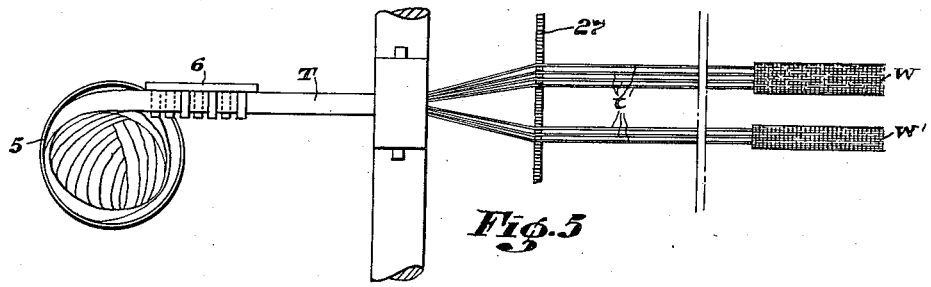
Figure 3:
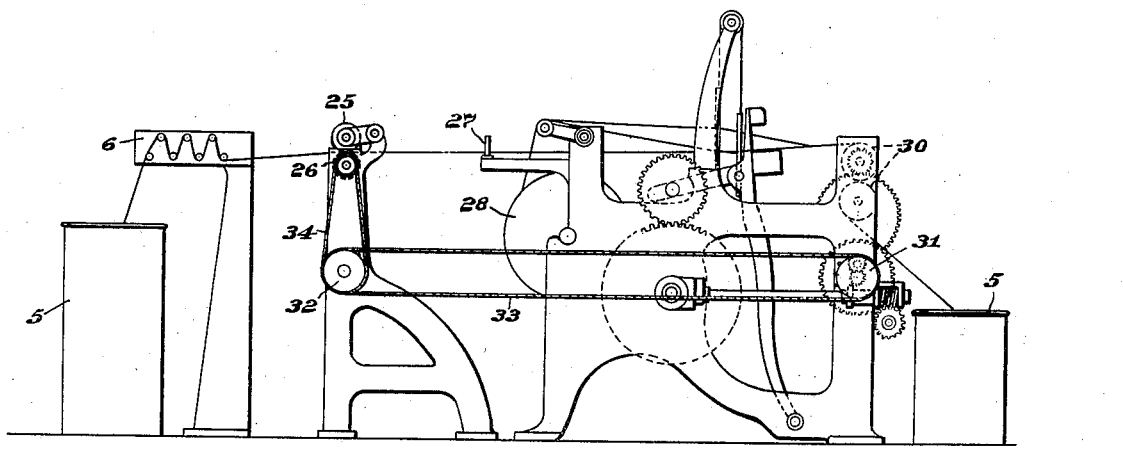
Fig. 3 is a side view, chiefly diagrammatic, showing a loom equipped with mechanism embodying this invention.

The application of a slightly modified embodiment of the invention to a loom is illustrated in Figs. 3, 4 and 5. Here upper and lower feed rolls 25 and 26 corresponding to the feed rolls 7 and 8 of the machine above described draw the tape from a container 5 and through a tension device 6 and feed it to a reed or comb 27 located just behind the warp beam 28. The rubber thread so fed to the machine is incorporated in a fabric by the weaving instrumentalities and this web is wound up on a takeup roll or fed into a suitable container by the takeup rolls 30. The degree of elongation or stretch necessary to the separation of the threads in the manner above described is maintained by providing the required difference in peripheral speed between the takeup rolls 30 and the feed rolls 25 and 26. As shown in Fig. 6, the feed rolls are driven from a sprocket wheel 31 which is positively connected through gearing with the takeup rolls 30, these connections including another sprocket wheel 32, a chain 33 connecting them, and a belt or chain connection 34 running to the lower feed roll 26.

Figs. 4 and 5 show diagrammatically arrangements of the elements illustrated in Fig. 3, the former showing two tapes supplying the rubber thread in the weaving of a single web W, while the latter view shows a single tape supplying the rubber threads used in weaving two webs $w$ and $w'$. Various other arrangements may be made in accordance with the requirements of individual products.

An application of the invention to a rubber thread covering machine is illustrated in Figs. 6 and 7. Here the tape splitting mechanism is essentially like that illustrated in Figs. 1 and 2 and its elements are indicated by the same, but primed, numerals. In this machine, however, instead of using a single reed, two are employed designated, respectively, at 35 and 36, although a single reed obviously could be used in place of them. In the arrangement shown the two reeds are located one behind the other and the teeth of the first reed or comb are spaced twice as far apart as are those of the second reed. Such an arrangement is sometimes of advantage since it lengthens the region in which the splitting of the tape occurs, produces less tension on a small area of the tape, and by accomplishing one-half of the division of the tape at one point and the other half at a succeeding point, enables this operation to proceed more smoothly.

The particular covering machine illustrated more or less diagrammatically in Figs. 6 and 7 is of a common type and includes a series of hollow bobbins arranged in pairs, one above the other, so that a single strand of rubber thread passes upwardly through both bobbins. In the drawings the thread $a$ is shown passing in this manner through the bobbins $b$ and $c$, and thence travelling over a grooved guide roll 37 on to a spool $d$ on which the covered thread is wound, this spool being mounted on and driven positively by a takeup roll or shaft 38. The usual driving connections also are provided for revolving the bobbins b and c in opposite directions so that yarn or thread is drawn from them and wound around the rubber thread a as it passes through them, the two threads being wound in opposite directions. The other threads fed from the tape splitting apparatus are guided to other wrapping or winding heads and are covered in the same manner. In order to maintain the desired speed relationship between the thread covering and the splitting mechanisms, the vertical shaft 40 which drives the operating shafts for the other elements of the covering machine, or is driven by them through bevel gear connections, is positively connected through bevel gears 41 to a horizontal side shaft 42 which operates through bevel gear connections with the lower feed rolls 8' and 12' to drive them at the desired speeds. Since all of these connections operate positively, a definite speed relationship is maintained between all of those units which feed or act on the rubber threads and the tape. This relationship is particularly important in a machine for covering rubber thread.

An application of the invention to a braiding machine is illustrated, largely diagrammatically, in Fig. 9. In this arrangement the tape T is drawn from the receptacle 5 by the upper and lower feed rolls 44 and 45, respectively, is fed through a reed or comb 46, and the threads travel from this reed over suitable guide rolls to the braiding instrumentalities which are here shown diagrammatically. Such a machine may make a flat or round braid. It is assumed in Fig. 9, however, that a covering is being braided around the entire assembly of rubber threads, as in making sleeve cord, excerciser cord, and the like. This assembly of threads t' is shown passing through the braider head and the product is taken off by the delivery rolls or takeup rolls 47. The driving shaft of these rolls is driven through spur gears 48, 49 and a worm gear 50, and its worm 51, from the main driving shaft 52. The shaft 53 of the upper feed roll 44 is driven from the shaft on which the worm gear 50 is mounted through gears 54 and 55. Thus the feed rolls and the takeup roll 47 are positively connected, and the desired speed relationship between them can be maintained. Preferably at least one of the takeup rolls 47 and one, or both, of the feed rolls 44 or 45, like the feed rolls above described, are covered with a layer of soft vulcanized rubber of sufficient thickness to operate in the manner described more particularly in connection with the feed rolls 7 and 8 of the construction illustrated in Figs. 1 and 2.

While the splitting of the tape as it passes through a reed or comb while under tension produced by two pairs of squeeze rolls arranged, respectively, in front of and behind the comb, as in some of the constructions above described, operates very satisfactorily for most sizes of thread, a somewhat different arrangement shown in Fig. 10 operates more satisfactorily both on fine sizes and also in splitting those tapes or ribbons in which the threads adhere to each other rather strongly. In this arrangement the rear feed rolls 56 and 57 and the front rolls 58 and 59 correspond, in general, to those shown in Figs. 1 and 2, the former rolls feeding the tape and the latter the threads after they have been split from it. Instead of using a reed, however, the tape T is fed from the rolls 56 and 57 between two horizontal pins or bars 60 and 61 located closely adjacent to each other and having rounded surfaces for engagement with the tape. The splitting action is produced in the neighborhood of these elements by leading alternate threads from the bars in opposite, or at least widely divergent, directions over guide rolls 62 and 63, respectively, and thence to the second pair of feed rolls 58 and 59. As in the case of the machine shown in Fig. 1, the latter rolls operate at a considerably higher peripheral speed than the rear rolls 56 and 57, thus maintaining the threads and the tape between them highly stretched and in a taut condition. The strain so applied acts on the two groups of threads at their junction with the tape to split the latter and divide it into its component strands.

It will be observed that in all of the foregoing embodiments of the invention, the thread is brought to the fabricating devices before the manufacturing operations on it have been fully completed and while it is in a form in which it can be handled much more conveniently than could the same weight of thread in its common form. This fact effects an important saving in the operations between the cutting of the thread and the placing of the thread in the fabricating machine preparatory to starting up that machine. During the operation of the machine the final step in the manufacture of the thread is completed; namely, its separation from adjacent portions of the tape, and it is then fed to the fabricating point. In addition to the advantage afforded by this arrangement, the invention provides a construction in which the tension on the threads as they travel to the fabricating point is maintained substantially uniform. This is highly important in braiding, covering, weaving, and similar operations. An exceptionally high degree of uniformity in this tension is realized in mechanisms of the character above described because of the fact that the tension is positively controlled by two sets of driven rolls, one feeding the thread to the fabricating point and the other taking it away from said point. It may also be pointed out that in such an arrangement as that shown, for example, in Figs. 1 and 2, or in Fig. 10, the rear rolls determine the rate of feed of tape to the fabricating instrumentalities, while the front rolls determine the amount or degree to which the rubber will be stretched. Since both of these sets of rolls are driven positively and in a definite relationship to each other and to the operation of the fabricating instrumentalities, these factors of rate of feed and degree of stretch are constantly under control.

While I have herein shown and described typical embodiments of my invention and applications of it to different machines, it will be understood that this disclosure has been made rather by way of explanation than limitation, and that the invention may be embodied in additional forms without departing from the spirit or scope thereof.

Having thus described my invention, what I desire to claim as new is:

1. In a machine for operating on rubber threads, the combination of apparatus for acting on a tape composed of rubber threads adhesively united to each other to split said tape into its component threads, means for feeding said tape to said apparatus, and additional means for feeding said threads away from said apparatus, said apparatus including devices cooperating with said means for guiding said tape to a splitting point and then guiding alternate threads split from said tape away from said point in widely divergent directions; and mechanism for driving both said feeding means at such speeds as to maintain the tape and said threads stretched as they pass through said splitting apparatus, whereby the tension so applied cooperates with their divergent directions of travel to split the tape into its component threads approximately at said point.

2. In a machine for operating on rubber threads, the combination of apparatus for acting on a tape composed of rubber threads adhesively united to each other to split said tape into its component threads, means for feeding said tape to said apparatus, and additional means for feeding said threads away from said apparatus; said apparatus including two parallel bars mounted closely adjacent to each other but spaced apart sufficiently to permit the tape to pass between them, and devices cooperating with said bars and said means for guiding alternate threads split from said tape away from said bars in widely divergent directions; and mechanism for driving both said feeding means at such speeds as to maintain the tape and the threads tightly stretched as they pass through said splitting apparatus, whereby the pull exerted on said threads by the second feeding means will cooperate with their divergent directions of travel to split said tape in the region at and adjacent to said bars.

3. The combination of a machine for operating on rubber threads, said machine including a takeup roll, a set of rolls for feeding a tape composed of rubber threads adhesively but separately united to each other, a second set of rolls for feeding the threads of which said tape is composed to said takeup roll, means located between said sets of rolls for splitting said tape into its component threads, and mechanism for driving all of said rolls in a predetermined speed relationship to each other such that the takeup roll will be driven at a sufficiently higher peripheral speed than said second set of rolls to maintain the tension on said threads desirable for the operation of said machine, while the second set of rolls will be operated at a sufficiently higher speed than said tape feeding rolls to maintain the tension on said tape and its threads required for the operation of said tape splitting means, whereby said tape will be divided into its constituent threads while it and said threads are being fed continuously from the tape supply to the point at which the threads are to be utilized.

4. In a machine for fabricating a product in which rubber threads are incorporated, the combination of instrumentalities for manipulating a series of rubber threads and one or more fibrous threads to produce said product, means for holding a supply of tape composed of rubber threads adhesively but separately united to each other, a pair of feed rolls for drawing said tape from said supply and feeding it toward said instrumentalities, said instrumentalities including a takeup roll for said product, mechanism for driving said takeup roll and said feed rolls in a predetermined speed relationship to each other to maintain the tape and the threads of which it is composed under a predetermined degree of tension as said threads are fed through said instrumentalities, and means between said instrumentalities and said feed rolls for operating on said tape to divide it into its component threads without materially disturbing the operating tension maintained on the threads while they are operated upon by said instrumentalities.

5. In a machine for fabricating a product in which rubber threads are incorporated, the combination of instrumentalities for manipulating a series of rubber threads and one or more fibrous threads to produce said product, means for feeding a tape toward said instrumentalities, said tape being composed of rubber threads adhesively but releasably united to each other and said means including a pair of feed rolls for the tape, a takeup roll for said product, mechanism for driving said takeup roll and said feed rolls in a predetermined speed relationship to each other to maintain the tape and the threads of which it is composed under a substantially predetermined degree of tension as said threads are fed through said instrumentalities, and means between said instrumentalities and said feed rolls for operating on said tape to break the adhesive bonds between said rubber threads and thereby to divide the tape into its component threads while they are being fed to said instrumentalities.

6. In a machine for operating on rubber threads, the combination of apparatus for acting on a tape composed of rubber threads adhesively united to each other to break the adhesive bonds between said threads and thereby to split said tape into its component threads, a pair of rolls for gripping said tape across its entire width and positively feeding it to said apparatus, a second pair of rolls for feeding said threads away from said apparatus, said apparatus including means cooperating with said rolls to guide said tape to a splitting point and then to guide alternate threads split from said tape away from said point in divergent directions, and mechanism for driving said sets of rolls in a fixed and predetermined speed relationship to each other such as to maintain the tape and said threads stretched as they pass through said splitting apparatus so that the tension thus applied cooperates with said divergent directions of travel to split the tape into its component threads approximately at said point.

7. A machine for splitting a rubber tape composed of rubber threads united to each other in side by side relation by a controlled and separable adhesion, comprising, in combination, a set of feed rolls for feeding said tape toward the splitting point, another set of feed rolls for feeding the threads of which said tape is composed away from said point, the first of said sets of rolls being adapted to grip the tape across its entire width, mechanism for driving both sets of rolls, said mechanism being constructed and arranged to drive the second set at a higher peripheral speed than the first set and thereby to maintain said tape and threads constantly in a greatly elongated and stretched condition while they are fed through said splitting point, and means between said sets of rolls cooperating with said feeding movement and the tension so maintained on said tape and said threads to break the bonds uniting said threads and thereby to divide the tape into its component threads while maintaining it at the splitting point in a flat condition substantially parallel to the bites of said rolls.

8. A machine for splitting a rubber tape composed of rubber threads united to each other in side by side relation by a controlled and separable adhesion, comprising, in combination, means for engaging the tape across its entire width and positively feeding the entire series of threads of which the tape is composed toward the splitting point, additional means for feeding said threads away from said point, each of said means including a roll, mechanism for driving said second means at a higher feeding speed than the first and thereby maintaining said tape and the threads of which it is composed constantly stretched and elongated to a relatively high degree while they pass through the splitting point, and a splitting device located between said means and cooperating therewith to break the adhesion uniting adjoining threads and thereby to split the tape into its constituent threads without materially disturbing the tension maintained on said tape and threads by said means, said means and said device cooperating to guide said threads and the tape in fixed and predetermined paths.

9. A machine for splitting a rubber tape composed of rubber threads united to each other in side by side relation by a controlled and separable adhesion, comprising, in combination, a set of feed rolls for feeding said tape toward the splitting point, another set of feed rolls for feeding the threads of which said tape is composed away from said point, each of said sets of rolls being adapted to grip all of the threads simultaneously, mechanism for driving both sets of rolls, said mechanism being constructed and arranged to drive the second set at a higher peripheral speed than the first set and thereby to maintain said tape and thread constantly in a greatly elongated and stretched condition while they are fed through said splitting point, and means between said sets of rolls cooperating with said feeding movement and the tension so maintained on said tape and said threads to break the bonds uniting said threads and thereby to divide the tape into its component threads and to maintain the threads so split from said tape in a side by side relationship generally parallel to the bites of said rolls as they travel from the splitting point to the second set of rolls.

10. A machine for utilizing a rubber tape composed of rubber threads united to each other in side by side relationship by a controlled and separable adhesion, comprising, in combination, means for engaging the tape across its entire width and positively feeding the entire series of threads of which the tape is composed toward a splitting point, additional means for feeding said threads away from said point, each of said means including a roll, means located at said splitting point for causing the feeding movement of said tape and threads and the tension maintained on them by the tape feeding and thread feeding means to break the adhesive union between the threads and thereby to divide the tape into its component threads, means for winding the threads so separated from each other, and mechanism for driving said tape feeding means, said thread feeding means and said thread winding means in predetermined speed relationships to each other such that the tape and threads will be constantly stretched and elongated to a relatively high degree while they pass through the splitting point and the divided threads travelling from the thread feeding means to said winding means will be maintained under the tension desirable for the operation of the winding means.

KENNETH R. SHAW.